United States Patent
Burns et al.

(10) Patent No.: US 6,731,019 B2
(45) Date of Patent: May 4, 2004

(54) APPARATUS AND METHOD FOR OPTIMIZING THE POWER TRANSFER PRODUCED BY A WAVE ENERGY CONVERTER (WEC)

(75) Inventors: Joseph R. Burns, deceased, late of Trenton, NJ (US); by Jo Ann E. Burns, executrix, Pennington, NJ (US); Paul Smalser, Trenton, NJ (US); George W. Taylor, Princeton, NJ (US); Thomas R. Welsh, Princeton, NJ (US)

(73) Assignee: Ocean Power Technologies, Inc., Pennington, NJ (US)

( * ) Notice: Subject to any disclaimer, the term of this patent is extended or adjusted under 35 U.S.C. 154(b) by 157 days.

(21) Appl. No.: 09/922,877

(22) Filed: Aug. 6, 2001

(65) Prior Publication Data

US 2002/0047273 A1 Apr. 25, 2002

Related U.S. Application Data

(60) Provisional application No. 60/223,132, filed on Aug. 7, 2000.

(51) Int. Cl.[7] .......................... F03B 13/10; F03B 13/12; F03B 13/00; H02P 9/04
(52) U.S. Cl. .............................. 290/42; 290/43; 290/53; 290/54
(58) Field of Search ............................. 290/42, 43, 44, 290/53, 54, 55; 60/398; 405/75, 76, 79; 417/331

(56) References Cited

U.S. PATENT DOCUMENTS

| | | | | |
|---|---|---|---|---|
| 4,418,287 A | * | 11/1983 | Syverson ..................... | 290/44 |
| 4,754,157 A | * | 6/1988 | Windle ........................ | 290/53 |
| 4,891,744 A | * | 1/1990 | Yamamoto et al. ............ | 363/89 |
| 5,083,039 A | * | 1/1992 | Richardson et al. .......... | 290/44 |
| 5,225,712 A | * | 7/1993 | Erdman ....................... | 290/44 |
| 5,798,632 A | * | 8/1998 | Muljadi ....................... | 322/29 |
| 6,023,134 A | * | 2/2000 | Carl et al. ................... | 318/140 |
| 6,127,758 A | * | 10/2000 | Murry et al. ................. | 310/168 |
| 6,137,187 A | * | 10/2000 | Mikhail et al. ............... | 290/44 |
| 6,205,405 B1 | * | 3/2001 | Pouvreau ..................... | 702/41 |
| 6,226,989 B1 | * | 5/2001 | Fredriksson et al. .......... | 60/501 |
| 6,300,689 B1 | * | 10/2001 | Smalser ........................ | 290/43 |
| 6,392,314 B1 | * | 5/2002 | Dick ............................ | 290/53 |

* cited by examiner

Primary Examiner—Thomas M. Dougherty
Assistant Examiner—Julio Gonzalez
(74) Attorney, Agent, or Firm—Henry I. Schanzer

(57) ABSTRACT

A wave energy converter (WEC) including an electric generator for capturing energy contained in ocean waves and converting it to electrical energy at the output of the electric generator may be characterized as an effective capacitive (or inductive) element. Systems embodying the invention include an inductive (or capacitive) element inserted in the circuit between the output of the electric generator and a load in order to achieve resonance with the effective capacitance (inductance) of the WEC and so as to increase the efficiency of the power transfer to the load. In certain embodiments the load coupled to the system has an optimum value which is made a function of the frequency of the ocean waves and the effective capacitance (or inductance). The effective capacitance (inductance) of the converter varies as a function of the frequency of the ocean waves. Accordingly, systems embodying the invention may include a controller for varying the load and/or the inductive (capacitive) element coupled in the system to resonate with the converter for increasing the efficiency of the system.

27 Claims, 11 Drawing Sheets

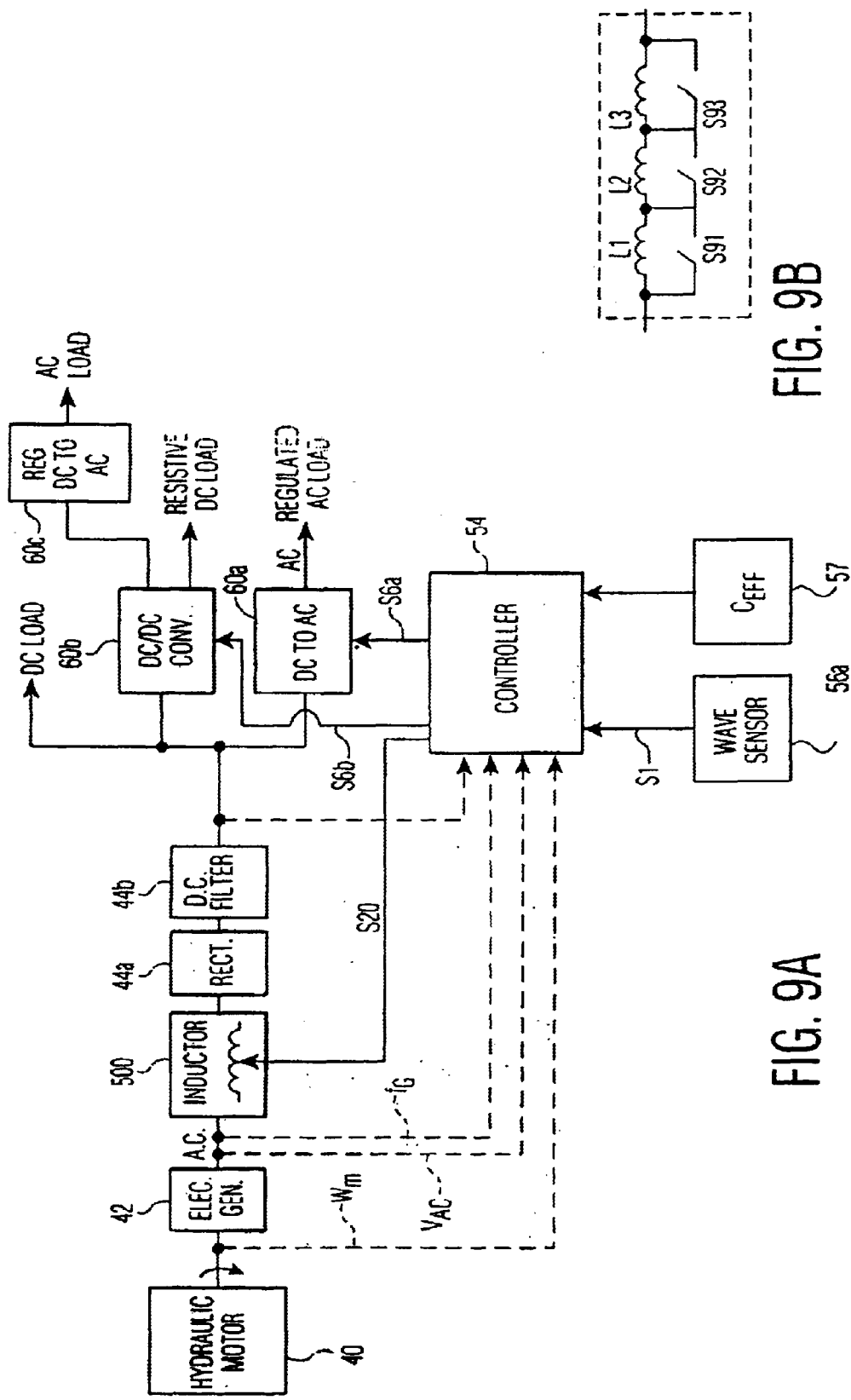

APPARATUS AND METHOD FOR OPTIMIZING THE POWER TRANSFER PRODUCED BY A WAVE ENERGY CONVERTER (WEC)

This application claims priority based on a previously filed provisional application titled "APPARATUS AND METHOD FOR OPTIMIZING THE POWER TRANSFER PRODUCED BY A WAVE ENERGY CONVERTER (WEC)" filed on Aug. 7, 2000 and bearing serial No. 60/223132.

BACKGROUND OF THE INVENTION

This invention relates to the conversion of energy from naturally occurring sources of mechanical energy, such as the mechanical energy present in ocean surface waves, to electrical energy and, in particular, to the efficient production and transfer of that energy.

Various wave energy converter (WEC) systems are known. For example, reference is made to U.S. patent application Ser. No. 09/379,421 filed Aug. 21, 1999, titled "Wave Energy Converter Utilizing Pressure Differences", assigned to the assignee of the present application and the teachings of which are incorporated herein by reference.

Numerous problems exist in the design of a mechanical system for harnessing the energy contained in ocean waves. Particularly, a problem exists in harnessing this energy efficiently. In addition, there is a further problem of converting the mechanical energy into electrical energy in an efficient manner. A significant difficulty in increasing the efficiency of converting the ocean wave energy into electric energy is due to the fact that the waves vary continuously in amplitude, frequency and phase as function of time.

SUMMARY OF THE INVENTION

Applicants' invention resides, in part, in the recognition that certain parameters and components need to be controlled to optimize the power transfer. Applicants' invention also resides in the recognition that a power generating mechanical system may be characterized as an effective capacitive (or inductive) element and that an inductive (or capacitive) element may be added to the system to resonate with the effective capacitance (inductance) of the mechanical system to increase the efficiency of the power transfer. Accordingly, systems embodying the invention include inductive (or capacitive) elements tending to cause resonance with the effective capacitance (inductance) of the power generating mechanical system in order to increase the efficiency of the system.

Applicants' invention also resides in the recognition that the load coupled to the system has an optimum value and in setting the load to such a value to increase the power transfer and the efficiency of the system.

Applicants' invention also resides in the recognition that the effective capacitance (inductance) of a mechanical energy converter system varies as a function of the frequency of the ocean waves. Accordingly, systems embodying the invention may include a controller responsive to the frequency of the ocean waves for varying the load and/or the value of the inductive (capacitive) element coupled to the system to resonate with the mechanical converter. The controller may also be used to vary the load to ensure that the value of the load applied to the output of an electric generator may be a continuously varying value which ensures the optimum transfer of power into the load.

BRIEF DESCRIPTION OF THE DRAWINGS

In the accompanying drawing like reference characters denote like components.

FIG. 9A is another block diagram of a system embodying the invention;

FIG. 9B is a diagram of an inductor network suitable for use in practicing the invention.

DETAILED DESCRIPTION OF THE INVENTION

To better explain the invention, reference will first be made to the simplified diagrams of various WEC structures shown in FIGS. 1, 2 and 2A.

Figure 1:
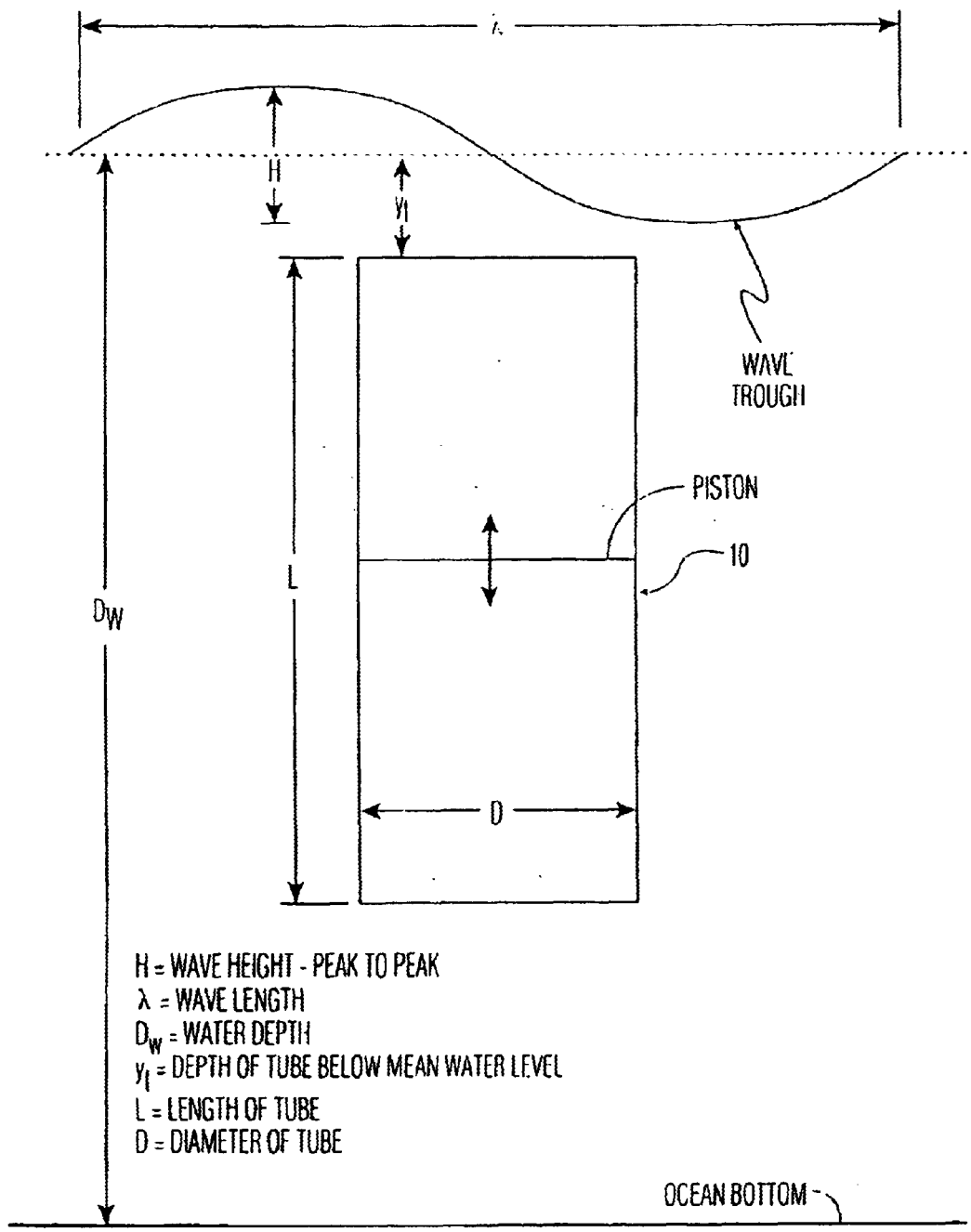
FIG. 1 is a sketch of a tubular wave energy converter (WEC) system with a piston deployed in a body of water for capturing energy from ocean waves and which may be used to practice the invention.

FIG. 1 is a sketch for identifying various relevant dimensional parameters of a system which may be used to practice the invention deployed in a body of water. FIGS. 2 and 2A are cross-sections of WECs identifying certain of their key elements which are used to practice the invention.

This invention teaches and shows: (a) that various portions of a mechanical, hydraulic, electromechanical and electrical subsystems may be represented by single electrical equivalent circuit which may be used for further development of the system; (b) the development of a mathematical model to characterize a buoy system, and more particularly, a WEC; (c) a method of extracting electrical power from the WEC; and (d) apparatus and methods to optimize power transfer from the WEC to a load. Thus, the invention resides, in part, in identifying the relationship between a buoy power generation system and the electrical loading on the system. For ease of illustration, in the discussion to follow, reference and assumptions are made which apply specifically to a cylindrically (tubular with piston) shaped WEC of the type shown in FIGS. 1, 2 and 2A. However, it should be understood that the invention is applicable to other structures used to convert naturally occurring and recurring forces into electrical energy.

1.0 System Differential Equation

Figure 2:
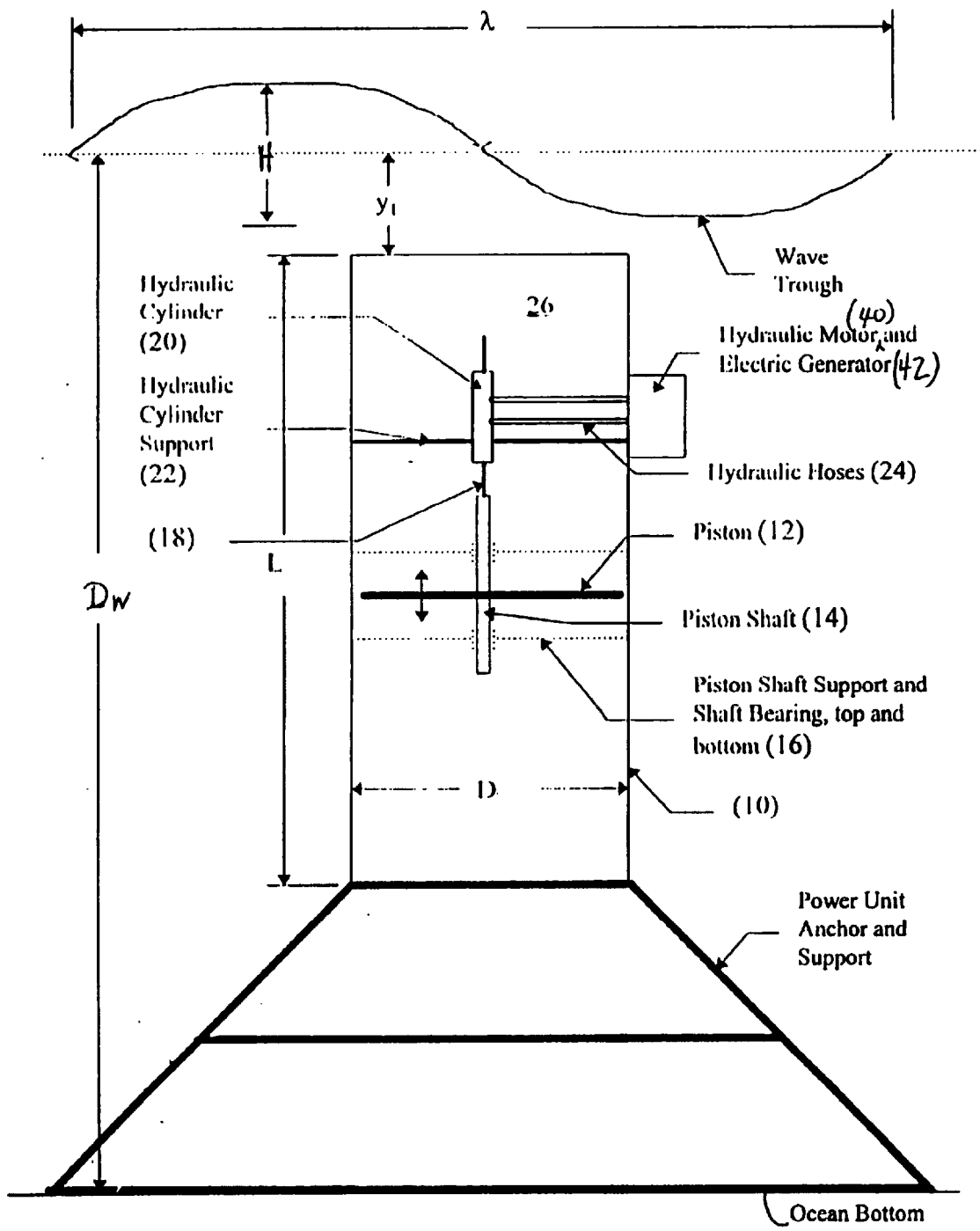
FIGS. 2 and 2A are cross sections of WECs which may be used to practice the invention.
Figure 2A:
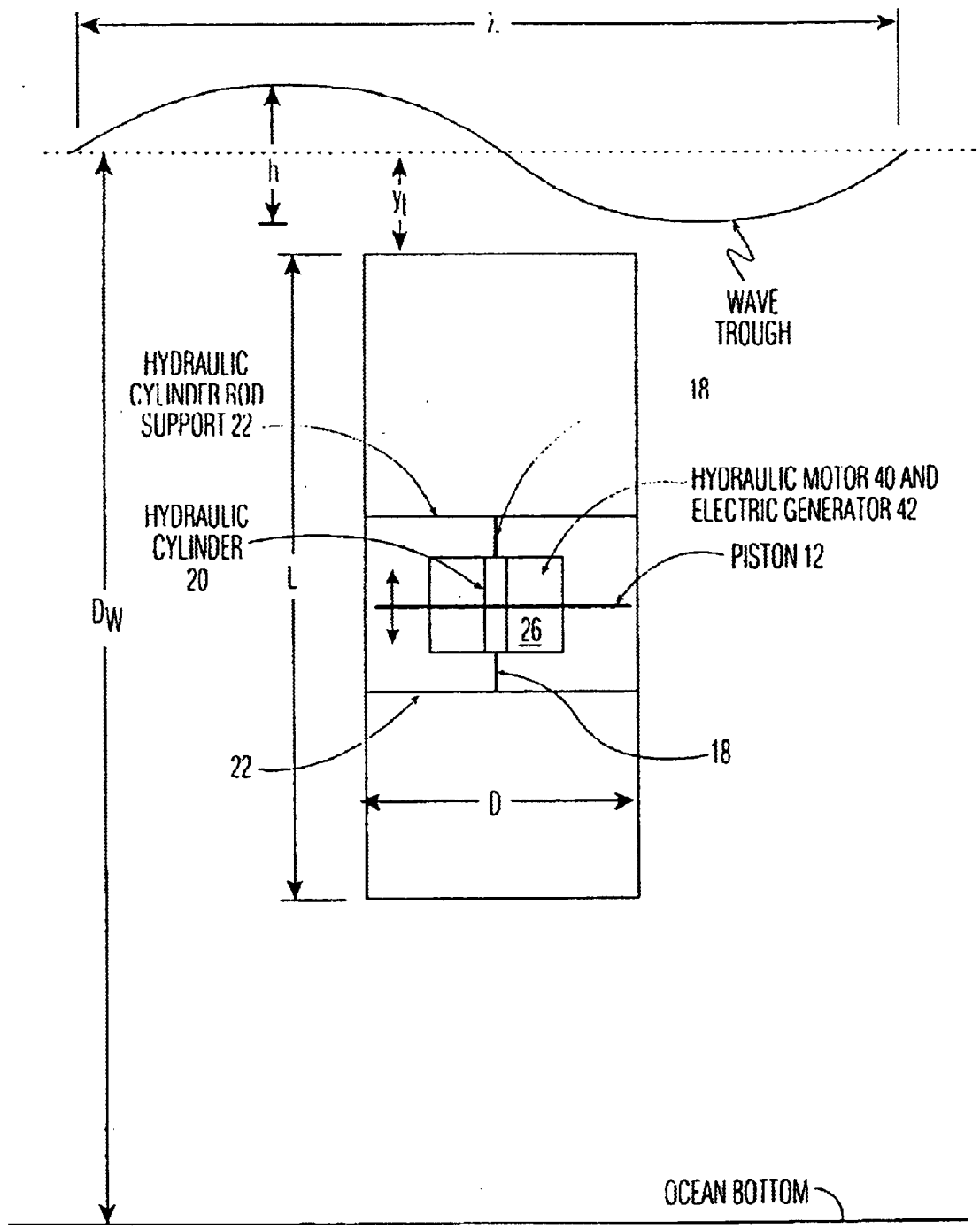

Referring to FIGS. 1, 2 and 2A, the basic WEC buoy differential equation is, by balance of forces, given by $$F_{IN} \sin \omega t = M_{WC} \partial V_P / \partial t + F_C \quad (1)$$

Where:

$V_P$ is the piston velocity:

$F_{IN}$ is the differential force applied to the piston by the ocean wave;

$M_{WC}$ is the mass of the water in the WEC and is equal to the volume of the WEC tube multiplied by the density of water;—Note: that this is a simplification and that, to be more exact, the term $M_{MC}$ should include the mass of other components such as the mass of the tube itself and an "added mass" term used to account for the mass of the water around the WEC being moved. As used herein and in the appended claims the term $M_T$ is meant to include all these masses. However, where $M_{WC}$ is much greater than any other term, the other terms may be omitted when making an approximate calculation. $M_{WC}\partial V_P/\partial t$ is the acceleration of the water within the buoy; and $F_C$ is the counter force exerted back on the piston as electrical power is extracted from the load.

This latter term ($F_C$) is highly significant since it represents the all important electromechanical coupling force between generator power extraction and the mechanical motion of the buoy.

Figure 3:
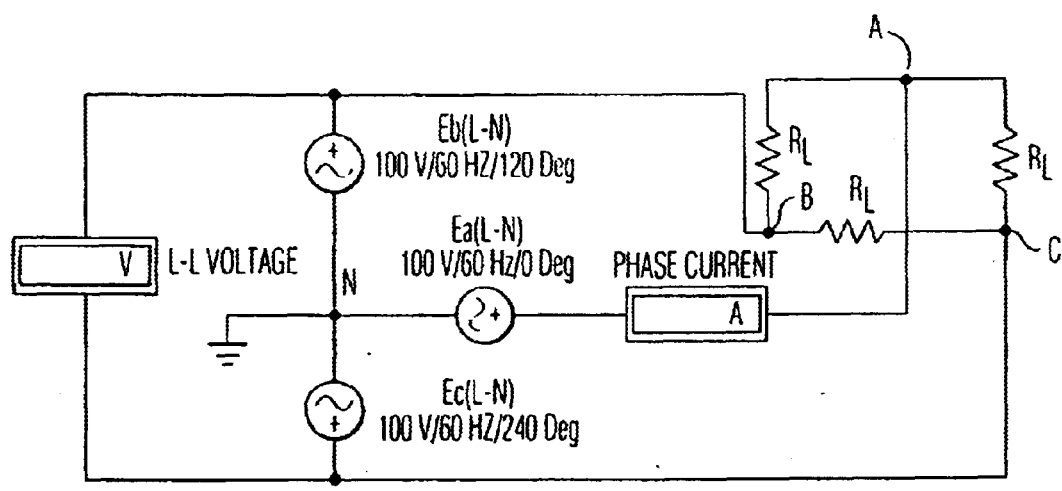
FIG. 3 is a simplified schematic diagram of a three-phase generator, driven by a motor contained within a WEC, for the application thereto of an optimum load in accordance with the invention.

Rewriting equation (1) in terms of the system parameters, we obtain in the case of a resistive load $$\rho g A H \delta/2[\sin \omega t] = \rho A L \partial V_P/\partial t + F_C = \rho A L \partial V_P/\partial t + K_G K_T V_P/(R_L r_0^2) \quad (2)$$

where:

$\rho$=mass density of water, g=gravity,

A=piston area where, as shown in FIG. 1, the area of the piston is essentially equal to the area of the tube or shell in which it is located. In general, A is equal to the cross sectional area of the shell (tube) when the shell is upright, H=wave height (peak to trough), L=length of buoy, $K_G$ and $K_T$ are the respective voltage and torque constants of the electro-mechanical (EM) generator, and $r_0$ (in meters of stroke per shaft angular rotation in radians) represents the linear to angular conversion constant of the hydraulic system; and $R_L$ the generator $\Delta$ connected load resistance (as shown in FIG. 3).

The parameter $\delta$ is derived directly from the solution of the wave equation and represents the fall-off in pressure in the vertical dimension. If $\delta$ is defined as a fall-off in pressure the results remain general. Here the results are given for a cylinder. Discarding non linear terms from eq. 2 and assuming the buoy stroke length to be small compared to the length, L, of the buoy the parameter $\delta$ is given by $$\delta = (1 - \cos h(2\pi L/\lambda) + \tan h(2\pi D_W/\lambda) \sinh(2\pi L/\lambda)) \quad (3)$$

where:

$\lambda$=to the wavelength of the surface wave; and $D_W$ is the water depth.

For sinusoidal motion, i.e., regular wave, we can switch to complex notation. Defining $F_{IN} \sin(\omega t) = \rho g A H \delta \sin(\omega t)$ as the effective input forcing function caused by the incoming wave on the piston, and the electro-mechanical coupling constant $K = K_G K_T / r_0^2$, the complex solution for the piston velocity with a resistive load $R_L$ is, $$V_P = F_{IN} R_L/(K(1+j\omega\tau)) = V_{PM}/(1+j\omega\tau) \text{ meters/sec} \quad (4)$$

Where:

$V_{PM} = F_{IN} R_L/K$, $\omega = 2\pi/T$ is the input wave angular frequency, $\tau = R_L C_{EFF}$ and $C_{EFF} = M_T/K$ is an equivalent capacitance proportional to the mass of the WEC including the water column in the WEC and "added mass" of surrounding water. For a tall cylinder $C_{EFF}$ is an equivalent capacitance approximately equal to $\rho A L/K = M_T/K$.

The recognition that the mass of the WEC including the water column may be characterized as an effective or equivalent capacitance is a significant part of the invention since it provides a basis for calculating the optimum load to be coupled to the system and the value of an inductive element which can be used to resonate with the equivalent capacitance to produce an increase in the transfer of power.

It is seen from (4) that the system dynamics with a resistive load can be represented as a first order low pass filter with a 3 dB point of $\omega_3 = 1/\tau$. It should be pointed out that all mechanical and electrical parameters can be derived from the solution for piston velocity given in Eq. (4). For a particular system, the corresponding equations for piston stroke $S_P$, power out Pout, and optimum resistive load $(R_L)_{OPT}$ are presented below.

1.1 Stroke $$S_P = V_P/j\omega = V_{PM}/(j\omega(1+j\omega\tau)) \text{ meters} \quad (5)$$

Note: only the real part of equation (5) need be considered.

Optimizing Power Extraction

A significant aspect of this invention is to relate electrical power extraction to the buoy system differential equation and to determine the optimum extraction strategy. FIG. 3 shows the equivalent circuit of an electric generator 42 used in FIGS. 2 and 2A. The electric generator is a $3\phi$ generator located within the buoy. (Voltages shown are RMS values.) In FIG. 3, the only voltages externally available are nodes labeled "A", "B", and "C" as the neutral "N" is not brought out. Because of this, power is extracted by $\Delta$ connected loads ($R_L$ in the figure) across the 3 line-to-line voltages ($v_{L-L} = \sqrt{3} v_{L-N}$).

1.2 Electrical Output Power (per leg or 1/3 $P_T$)

$$P_{OUT} = V_{LL}^2/(2R_L) = K_G^2 107 \, s^2/(2R_L) = K_G^2 |V_P|^2/(2r_0^2 R_L) = F_{IN}^2 R_L r_0^2/(2K_T^2(1+\omega^2 R_L^2 C_{EFF}^2)) \quad (6)$$

1.3 Optimum Load Resistance

The optimum load resistance is that value of $R_L$ which maximizes the generator power output $P_{OUT}$. By inspection of Eq. (6), it is seen that $P_{OUT}$ goes to zero at $R_L = 0$ and $\infty$ and is positive in between so that an optimum does exist. By definition, $(R_L)_{OPT}$ is determined by the solution to $\partial(P_{OUT})/\partial(R_L) = 0$. Performing this operation on (6) gives, $$(R_L)_{OPT} = 1/(\omega C_{EFF}) \quad (7)$$

The condition (7) is equivalent to $(R_L)_{OPT} C_{EFF} = 1/\omega = T/(2\pi)$. Substituting this into (6) yields the result that the output power is approximately proportional to $H^2 T$ or the efficiency is constant as long as the load value tracks according to (7). (This ignores, for now, the length degradation factor of Eq. (2) which is independent of $R_L$ but falls off significantly with T.)

Substitution of $(R_L)_{OPT}$ into Eq. (6), gives the maximum power available for a general system as:

$$P_{MAX} = [(\rho g H A \delta)^2 T/(32\pi M_T)][Kg/Kt] \quad (8a)$$

for a cylinder $P_{MAX}$ may be expressed as follows:

$$P_{MAX} = \rho g^2 H^2 T A \delta^2 / (32\pi L) \quad (8)$$

where $P_{WAVE}$ is the total available power from the wave incident on a buoy of diameter D and length L, i.e., $P_{WAVE} \approx H^2 T D$ (kW).

Figure 4:
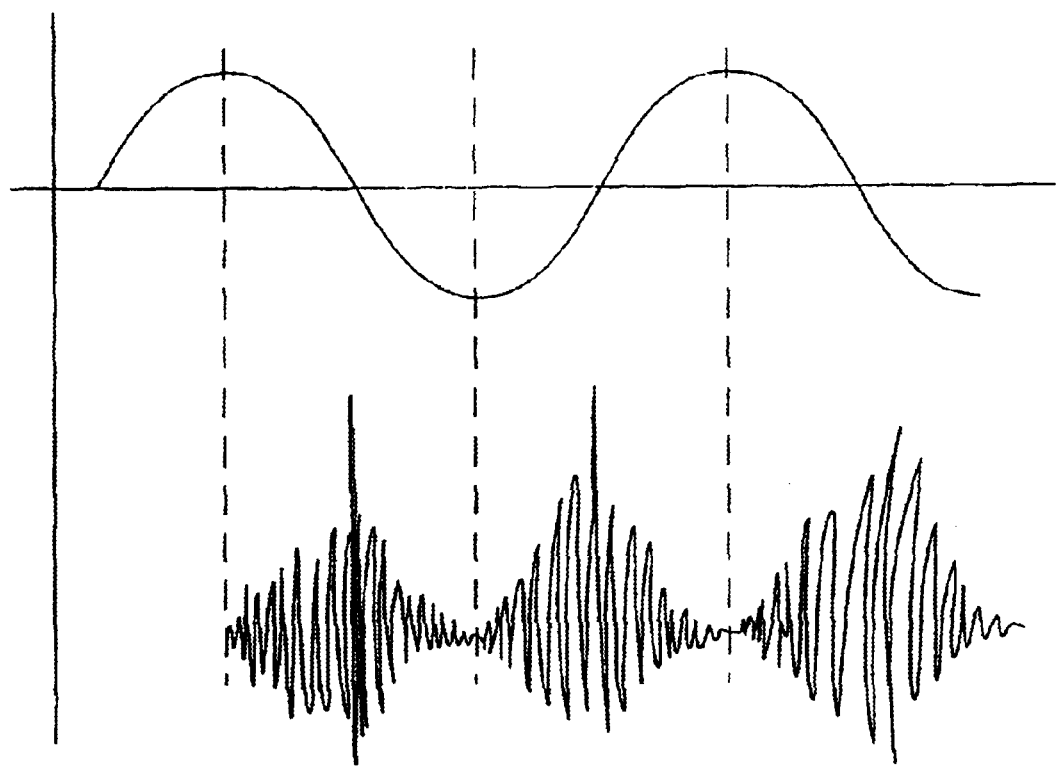
FIG. 4 is a waveform diagram illustrating the heavy modulation of the generator output voltage.
Figure 4:
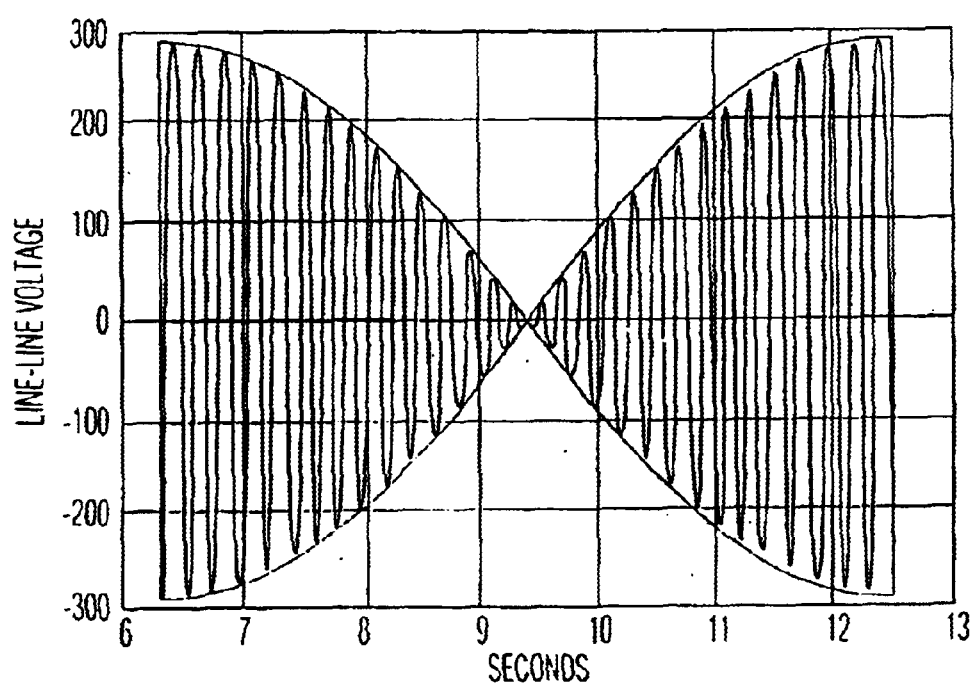

The electric generator output voltage waveform may be heavily modulated as shown in FIG. 4.

Figure 5:
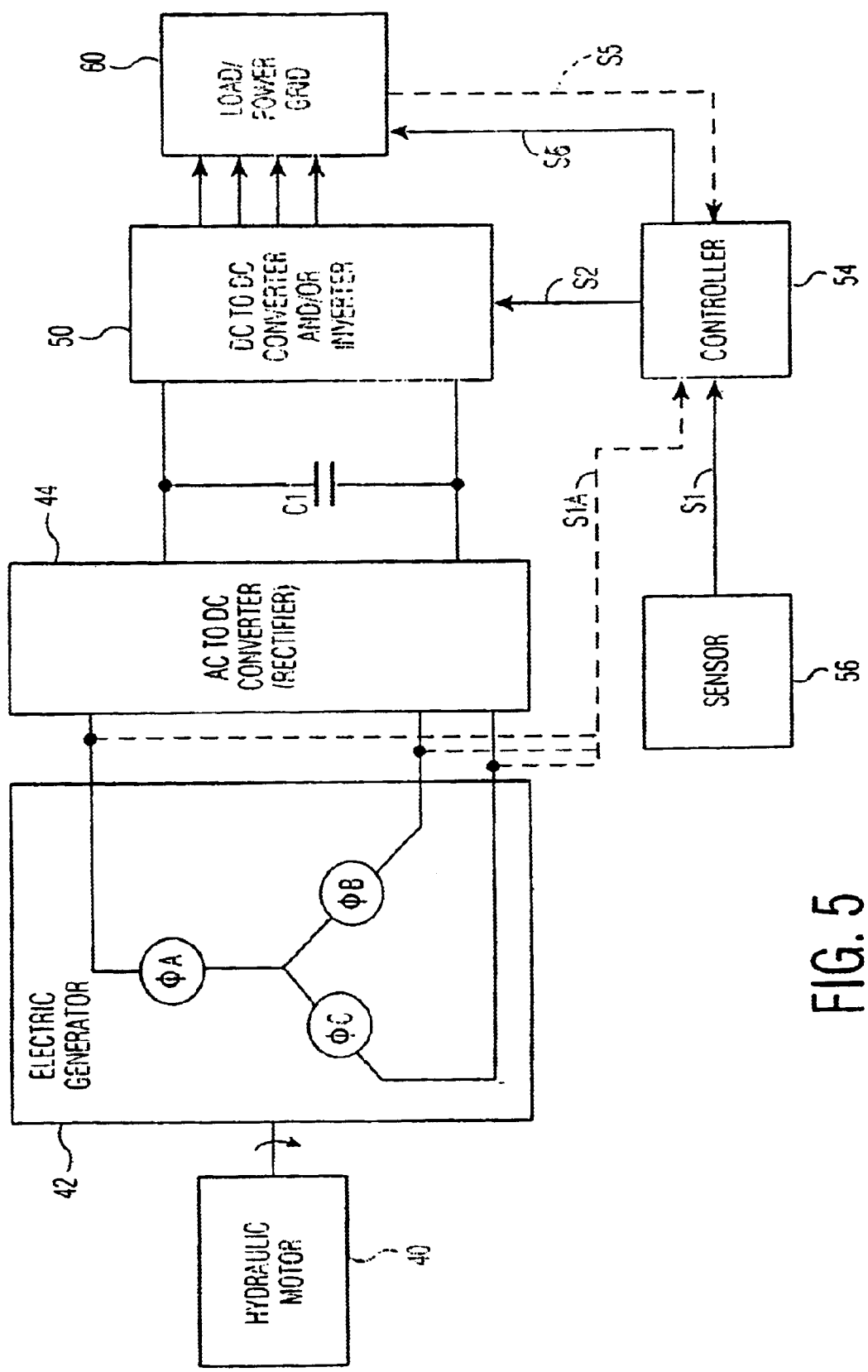
FIG. 5 is a simplified block diagram of part of a system embodying the invention.
Figure 6:
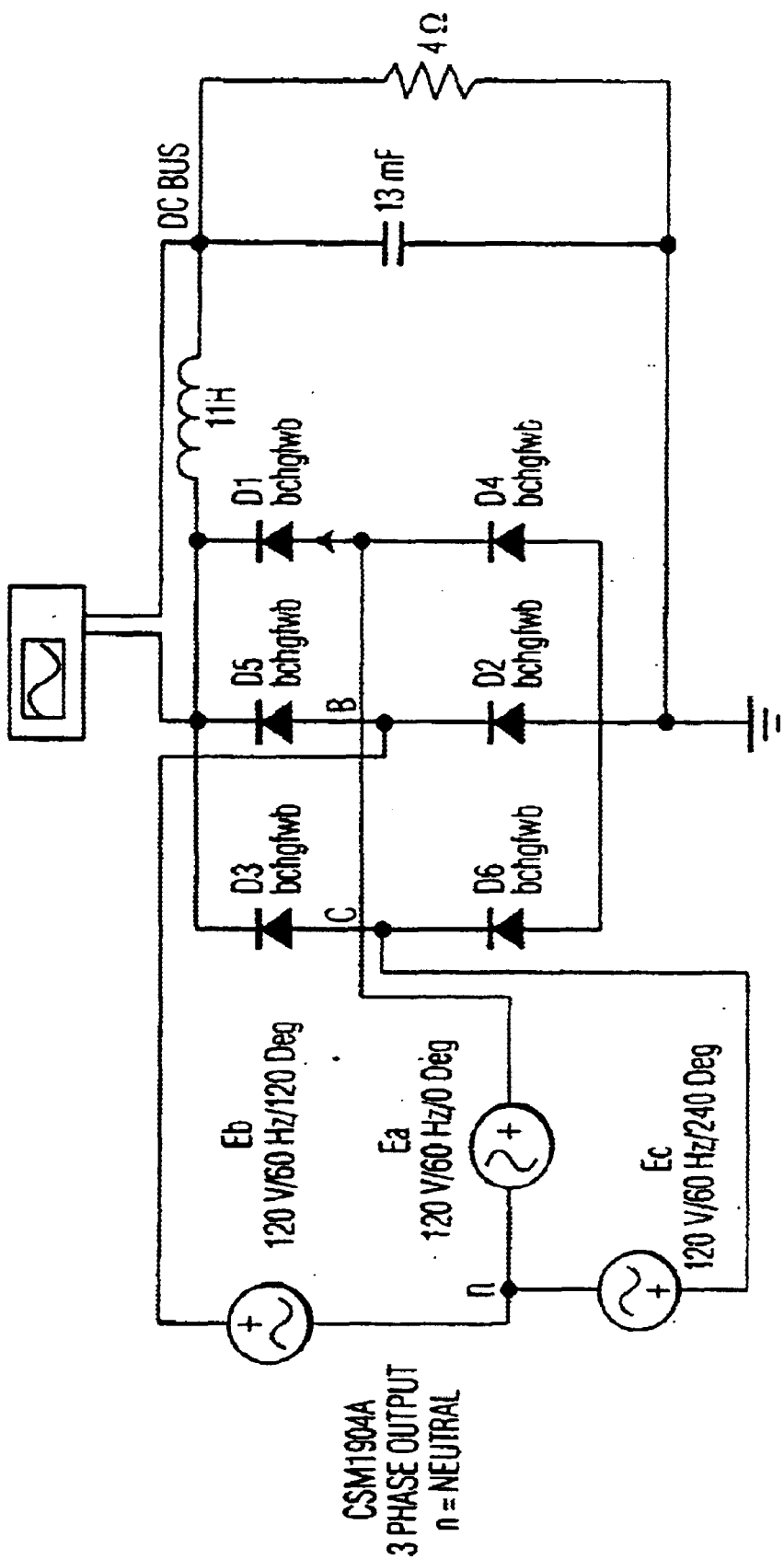
FIG. 6 is a schematic diagram of a rectifier circuit which may be used in systems embodying the invention.

Achieving maximum power transfer requires that the load seen by the generator equals to $(R_L)_{OPT}$. To accomplish this result, a system embodying the invention may be configured as shown in FIG. 5. An hydraulic motor 40 (or any suitable converter) drives an electric generator 42. The output of the electrical generator 42 is supplied to an AC to DC converter 44. The AC to DC converter 44 may be a rectifier circuit of the type shown in FIG. 6. However, it should be appreciated that any suitable AC to DC converter may be used. The output of the AC-to-DC converter is applied across a storage capacitor C1, which in effect stores the energy captured by the WEC from the ocean waves. Where the voltage across C1 would vary significantly, a DC-to-DC converter (e.g., a switching regulator) may be used to provide a more constant DC voltage to inverter 50. The output of the DC-to-DC converter section is then applied to the power inverter section which is coupled at its output to a power grid 60 which is the ultimate load and goal for which the system is intended. Inverter 50 converts the input DC voltage to a single phase or to a multiphase AC signal which is supplied to the power grid and which must meet the requirements of the grid. However, the power grid represents a variable load which, depending on demand, may range over a wide range of values. This variable load is reflected via the converter-inverter 50 across the storage capacitor C1 and back across the output of the AC to DC converter 44 and via the converter 44 to the electrical generator 42.

As noted above, it is important to maintain the impedance seen by the electrical generator close to the value of $R_{LOPT}$. In circuits embodying the invention, the condition of the load may be sensed and a signal S5 may be fed to the controller 54 indicative of the load condition. The value of the load may then be calculated by the controller 54. The value of the load impedance may then be controlled by means of a controller 54 which controls the rate at which the inverter is switched. Alternatively, the controller 54 may be used to directly increase or decrease the value of the load by means of a control signal S6.

At the same time, the power available to be distributed is also variable since it depends on wave energy applied to the WEC, which may vary considerably. By way of example, when there is more power available than is required by the load or when the load decreases below a certain level the controller 54 can (via a signal such as S6) be used to switch in storage batteries or other energy absorbing means which can subsequently be used to provide more (or less) power when load conditions change. The controller 54 is also responsive to a signal, identified as S1, from a sensor 56. The sensor 56 may be any sensor capable of indicating and/or determining the power available from the waves and/or the conditions of the WEC system.

Alternatively, sensor 56 may be any sensor capable of signaling to the controller 54 the amount of power available from the electrical generator 42. The controller 54 is pre-programmed to respond to the sensor 56 generated signals S1 to, in turn, generate a signal, or signals, identified as S2, which is fed to the inverter 50 and which controls how much power can be drawn (taken) from the inverter and supplied to the power grid (i.e., the ultimate load).

In addition (or alternatively), the power (voltage and/or current) being generated by generator 42 may be supplied (see dashed lines S1A in FIG. 5) directly to the controller 54. Controller 54 normally has a much faster response time than the ocean wave or the electrical power signal being generated by the ocean wave. The controller 54 may thus act directly in response to the ocean wave input.

Alternatively, the controller 54 may be pre-programmed and loaded with statistical data as to ocean wave and climate conditions so as to control the system response with a view to optimizing the power transfer. The signals S1 (or S1A) and S2 and the controller action on inverter 50 thus effectively control the value of $R_L$ seen by the generator 42 so that the system is operated such that the effective load is made or kept equal to $R_{LOPT}$. It is significant that, in systems embodying the invention, the available or average input power, as well as the desired optimum load, are factored into the equation to optimize power transfer.

It should be emphasized that a particular rotary hydraulic motor-rotary electrical generator was used for purpose of example and that any other suitable motor generator combination may be used (e.g., a rack and pinion combined with a generator, or a linear electromagnetic generator instead of a hydraulic rotary generator) may be used. Likewise, many different types of converters responsive to naturally recurring sources of energy (for example, a water flow turbine) may be used instead of the WECs shown herein. The cylindrical tube shown in FIGS. 1, 2 and 2A are only for purpose of illustration. The invention may be used in any system including any shell (e.g., container, cylinder, cone) of arbitrary shape suitable for containing a volume of water which in combination with a piston like structure can capture the force of the waves and convert that force to a mechanical motion or force which is then converted to electrical energy.

Figure 5A:
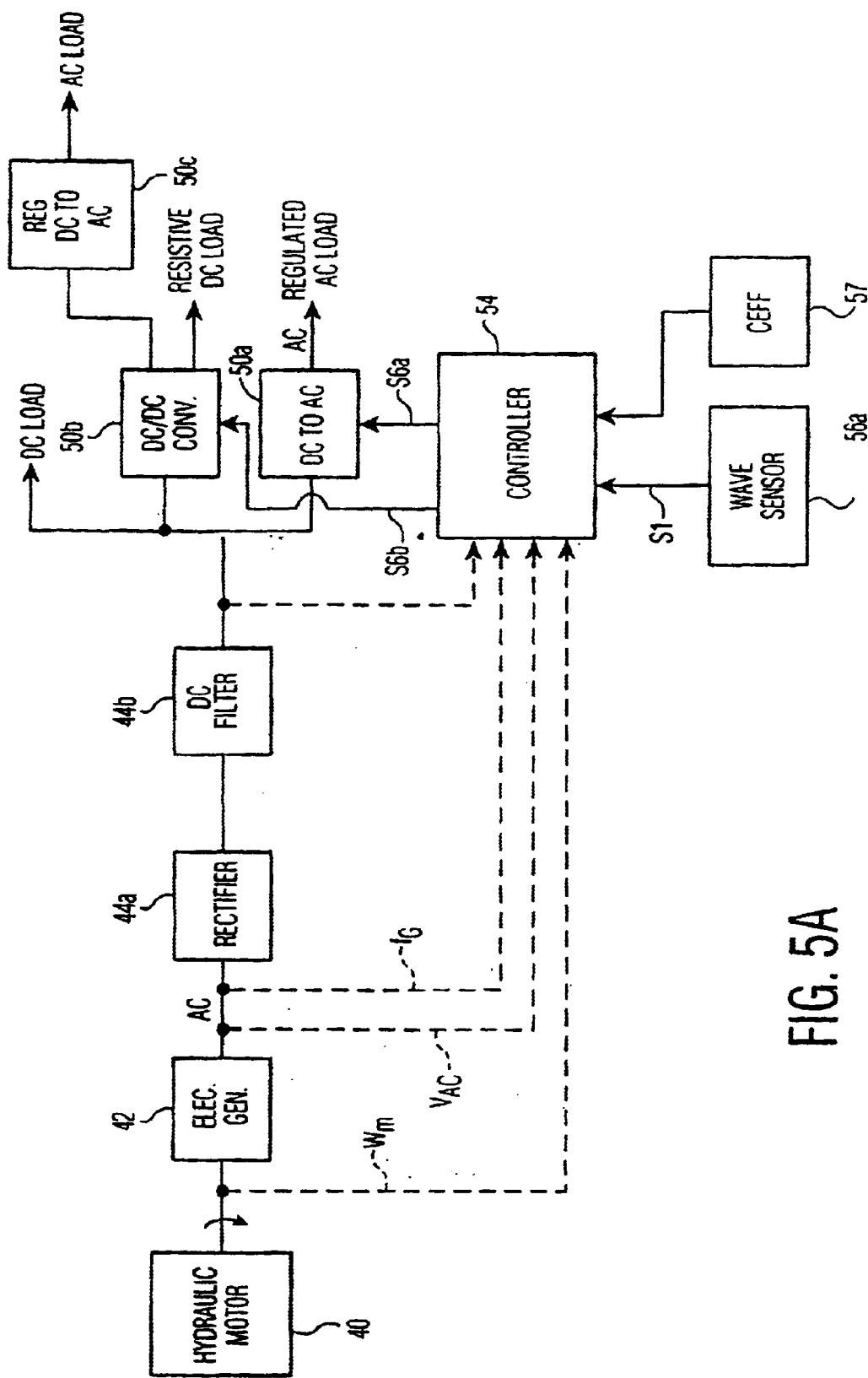
FIG. 5A is a another block diagram of a system embodying the invention.

A slightly more detailed and modified version of FIG. 5 is shown in FIG. 5A. FIG. 5A illustrates that the any of the following signals may be applied as inputs to the controller for indicating certain input power or other operating conditions: (a) rotation speed ($\omega$m) of the hydraulic motor 40: (b) The frequency (fG) of the generator 42; (c) the amplitude (VAC) of the generator voltage; and (d) a rectified voltage at the output of a filter 44b. These signals may be in addition to wave sensor signal and other suitable signals (e.g., from CEFF). The controller can then send one or more signals (e.g., S6a, S6b) to a DC-to-AC converter (e.g., an inverter) 50a, a DC-to-DC converter 50b (e.g., a switching regulator) capable of driving a DC load or a regulated DC-to-AC converter (e.g., an inverter) 50c. The controller signals (S6a, S6b) an be used to automatically and/or selectively control the operation of any one of the loads such that the generator 42 "sees" the optimum load, RL(OPT). The controller can also use look up tables preprogrammed into the controller for maintaining RL(OPT); where RL(OPT) is equal to $1/(\omega C_{EFF})$.

Efficiency Improvements with Electrically Resonant Loads

Applicants recognized that the $M_{WC}$ acceleration term in Eq. (2), above, could be made resonant with an inductive generator load to greatly improve power transfer efficiency. Applicants further demonstrated that each phase of the electrical generator could be loaded with a series resonant circuit and then observed both the electrical and mechanical behavior of the system combination including the WEC, the hydraulic motor and the electric generator. The highly simplified schematic of a particular resonant load is shown in FIG. 7.

Figure 7:
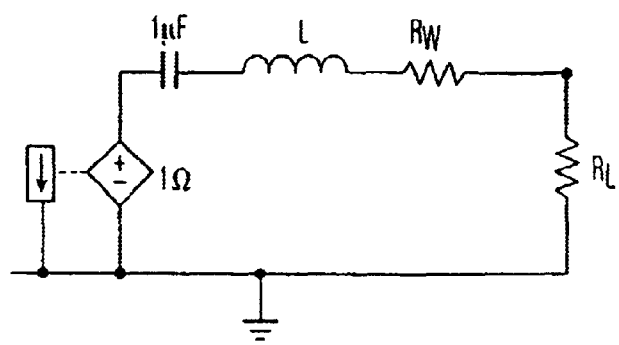
FIG. 7 is a highly simplified diagram of an inductive element used to resonate with a mechanical to electrical converter exhibiting capacitive characteristics.

The electrical resonant frequency of the load circuit shown in FIG. 7 was found to be 48 Hz corresponding to a shaft speed of 16 rps (3 pole pairs in the generator). The electrical output showed a sharp peak at this frequency but, most important, the mechanical torque applied showed the same sharp peak at the same frequency. In other words, electrical load current produces a counter torque in both magnitude and phase! This means that an electrical component in the generator output loop can, indeed, resonate with a mass of water in the WEC and produce power gain by approaching a unity system power factor. The extent of the improvement is further discussed below.

Efficiency Improvement at Resonance

Therefore, another aspect of Applicants' invention relates to apparatus and methods for controlling the output power delivered to a resistive load when it is inductively tuned at, or near, the dominant wave frequency. This modifies the system differential equation (2) and results in a $2^{nd}$ order system in velocity which can be modeled by the electrical equivalent circuit of FIG. 8.

Figure 8:
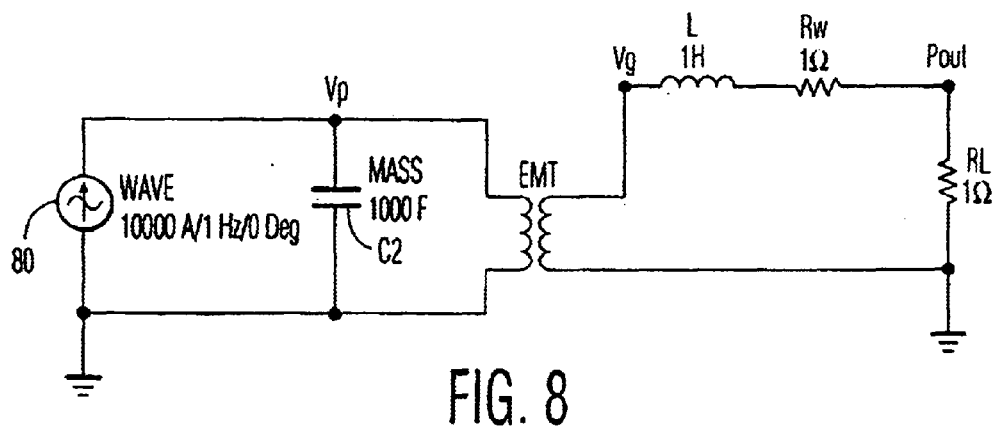
FIG. 8 is an electrical equivalent circuit of a system embodying the invention.

In FIG. 8, the current source 80 represents the force applied to the piston of a buoy by ocean waves (1 A=1 N), the capacitance C2, which is equal to $C_{EFF}$, is the mass of the water column (1 F=1 Kg) and the EMT is a mythical (but mathematically correct) Electro-Mechanical Transformer which performs the function of translating the linear motion of the WEC into the rotary motion of the generator via the hydraulic system. The power generation capabilities of electrically resonant systems may now be obtained and examined. The output power as a function of input wave power is $$\text{Pout} = I_M^2 R_L / ((1-\omega^2 L C_E)^2 + (\omega(R_L+R_W)C_E)^2) \quad (9)$$

where $I_M = k_G K F_{IN} \delta / r_0$ and $F_{IN} = \rho g A H \delta / 2$ are as defined, above, and $C_E$ is equal to $C_{EFF}$.

Figure 9:
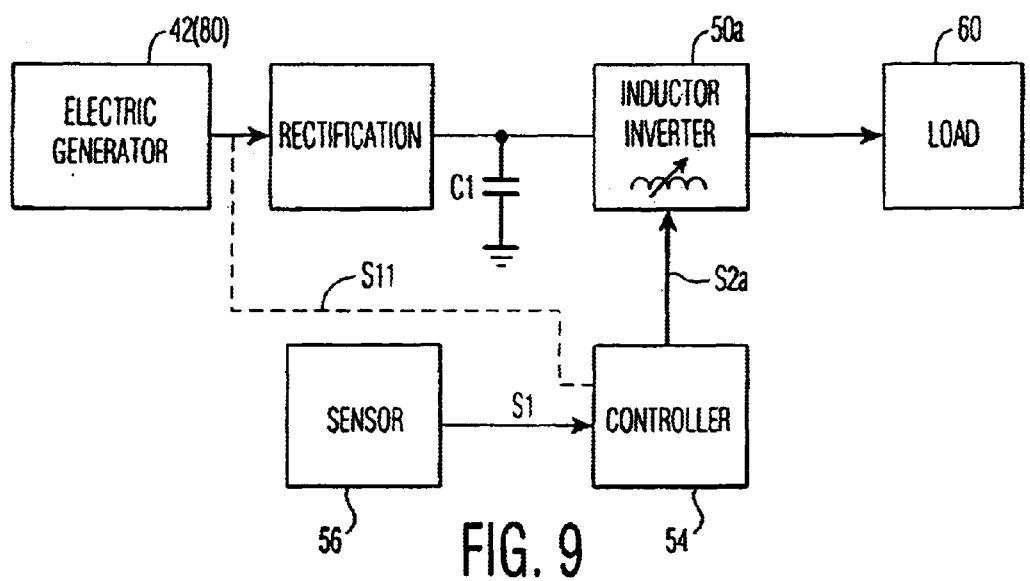
FIG. 9 is a simplified block diagram of a system embodying the invention.

Pout may be computed for different types of buoys and for different wave conditions. In a particular embodiment the inductor L was chosen to resonate with $C_E$ at the peak of the wave period power spectrum. In systems embodying the invention controls may be included to enable the inductor to be continuously varied, as shown in FIG. 9, below. Also, in the embodiment of FIG. 8, $R_L$ was chosen to be equal to the winding resistance, $R_W$, of the inductor which maximizes the power at resonance. The available power $P_{AV}$ and output power $P_{OUT}$ (resistive load) and $P_{RES}$ (resonant load) may then be computed.

FIG. 9 is a simplified diagram of a system in which the controller 54 controls and changes the actual inductance of inductors (in inverter 50a) connected in series with the load 60 (or perform a mathematically equivalent function) to obtain increased output power and efficiency. In response to the sensor signal S1 from sensor 56, controller 54 is preprogrammed to modify an inductance network in inverter 50a, which is similar to inverter 50, but which includes inductors which can be tuned to the load. In this embodiment, as above, the input power may vary as a function of the climate and the load may vary as a function of power demand. However, in both instances, Applicants' invention functions to optimize transfer of power for varying input power conditions and output power demands. That is, a sensor 56 can be used to sense the conditions of the input waves. The controller can be pre-programmed to respond to these conditions on a statistical basis. Alternatively, the controller can respond directly to the input conditions of sensor 56. Still further, the output conditions of the electrical generator can be fed to the controller, as shown by dashed line S11. Since the wave period is very (extremely) long compared to the response time of the controller 54 (which would normally be used), much computation and processing can be performed while the electrical output of the generator is being sensed.

FIG. 9A is a modified version of FIG. 5A showing the placement of an inductive element 500 between the output of the electric generator 42 and the input to the rectifier section 44a. The inductive element 500 may be an inductor having a fixed value, where the fixed value is selected such that $\omega L$ is approximately equal to the average value of $1/(\omega C_{EFF})$. Alternatively, as shown in FIG. 9A, the inductive element 500 may be a variable inductor whose value may be varied by controller 54 as a function of any of the input signals to the controller 54 and/or as a function of any change in the ocean waves causing $C_{EFF}$ to change; with the changes in inductance being such as to maintain $\omega L$ approximately equal to $1/(\omega C_{EFF})$.

Alternatively, as shown in FIG. 9B, the inductive element may comprise a number of different valued discrete inductors with switches controlled by controller 54 for determining the amount of inductance inserted in the circuit between the electric generator 42 and the rectifier 44a.

In accordance with the invention the controller can send control signals to any of a number of different loads (e.g., 60a, 60b, 60c) such that the generator 42 sees $R_{L(OPT)}$. Concurrently, the controller 54 can switch into the circuit the optimum inductance required to achieve resonance as a function of an input (S1) from the wave sensor 56a, or form the $C_{EFF}$ monitor 57 or form any other input to the controller 54. The controller may use a look up function or an algorithm with the frequency of the waves and/or $C_{EFF}$ as independent variables.

Alternatively, the controller 54 can vary the inductance slowly over several wave periods (cycles) during which the system "hunts" for maximum power transfer points. This may be accomplished by periodic computation of power per wave which in turn can make use of a number of different sets of parameters (e.g., Power is equal to voltage times current, or speed times torque, or velocity times force).

Alternatively, the controller may also be used to send signals to an AC to DC converter such that the voltage leads or lags the current and at the same time control the impedance to be approximately equal to $R_{L(OPT)}$. Thus, the effective inductance to resonate with the electromechanical system may be accomplished in a different manner.

Figure 10:
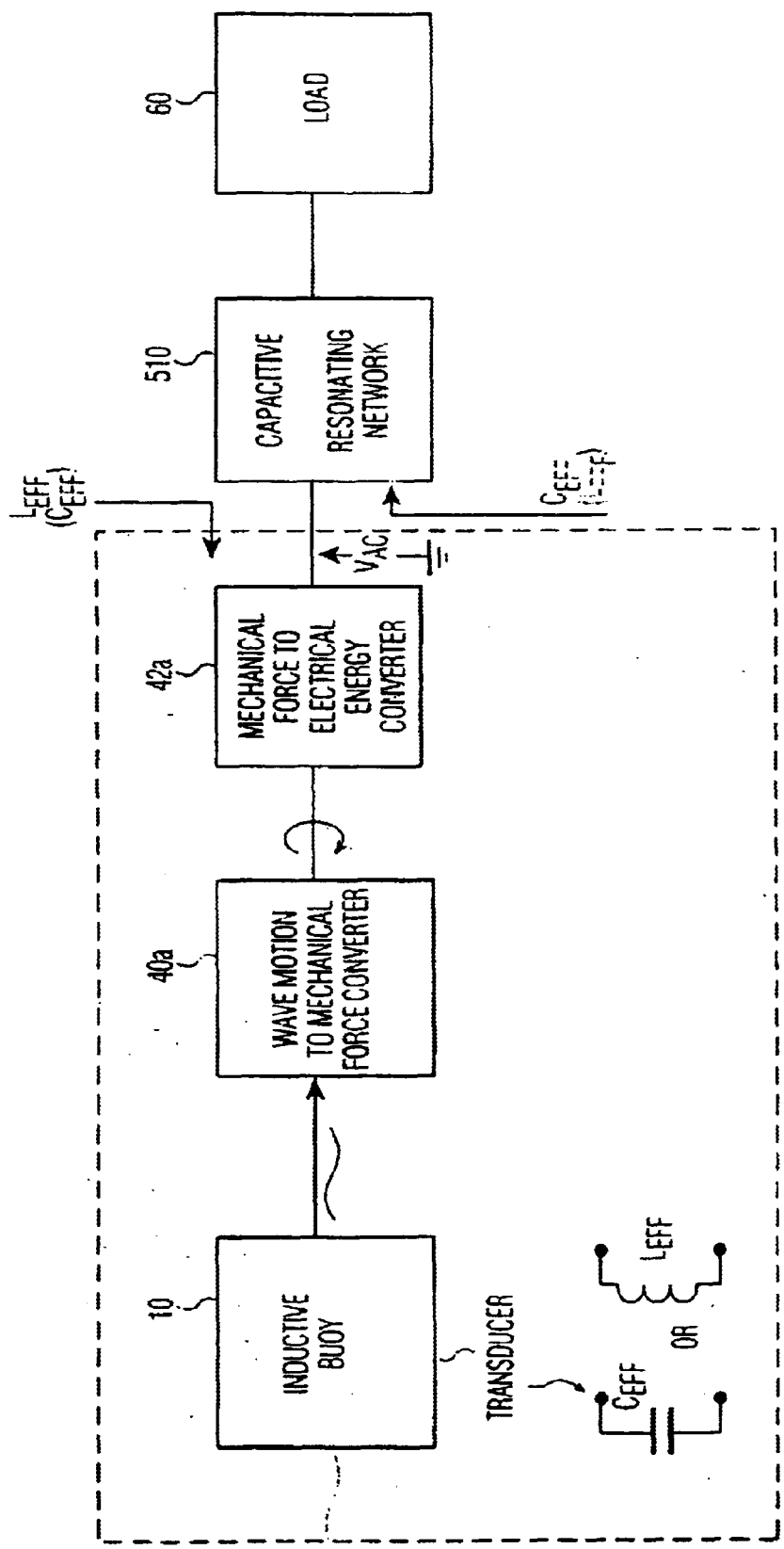
FIG. 10 is a block diagram illustrating that a wave energy converter (WEC) for use in practicing the invention may be either inductive ($L_{EFF}$) or capacitive ($C_{EFF}$).

In FIGS. 1, 2 and 2A the equivalent impedance is characterized as being capacitive and equal to $C_{EFF}$. To achieve resonance an inductive element is inserted into the circuit. However, it should be appreciated that the equivalent impedance of a WEC functioning differently than the WECs of FIGS. 1, 2 and 2A may be characterized as being inductive and equal to $L_{EFF}$. For such a WEC, a capacitive component would be inserted in the generator output loop having a value to resonate with $L_{EFF}$. This is shown in a general manner in FIG. 10, where a resonating network 510 is placed in the power transfer loop. If the output impedance of the mechanical force to electrical energy converter 42a is characterized as $\omega L_{EFF}$ then, the resonating network is controlled and made capacitive such $\omega L_{EFF}$ is equal to $1/\omega C_{EFF}$.

Regarding the piston shown in FIGS. 1, 2 and 2A, note that the piston may be any inner body component such that its movement within a shell (tube) causes a mechanical, electrical or electromechanical response to be generated.

What is claimed is:

1. A wave energy converter (WEC) comprising:
   a shell mounted about a piston forming a combination which when placed in a body of water is responsive to waves in the body of water for producing relative motion between the shell and the piston;
   a mechanical motion to electrical energy converter, including an electric generator, responsive to the relative motion between the shell and the piston for producing at an output of the electric generator at least one of a voltage and current which is a function of the relative motion; and means coupling a load to the output of the electric generator, said load having an impedance whose value is selected to be a function of the period of the waves in said body of water and of the mass of the water in the shell.

2. A WEC as claimed in claim 1, wherein the impedance of said load is selected to be approximately equal to $1/(\omega)(C_E)$ for optimizing the electric generator power output for predetermined conditions of the body of water in which the WEC is placed; where:

$\omega$ is equal to the angular frequency of the waves in said body of water expressible as $2\pi/T$ where T is the period of the waves; and $C_E$ is approximately equal to MT/K, where MT is approximately equal to the mass of the shell and the mass of the water moved by the shell, and K is an electromechanical coupling constant.

3. A WEC as claimed in claim 2 wherein one of the shell and the piston is relatively stationary and the other one of said shell and piston moves in response to said waves.

4. A WEC as claimed in claim 3, wherein the mechanical motion to electrical converter includes a motor which is responsive to mechanical forces due to said relative motion between the shell and the piston for driving the electric generator and producing electrical energy proportional to said relative motion, which electrical energy is applied to said load.

5. A WEC as claimed in claim 4 wherein said load is primarily resistive.

6. A WEC as claimed in claim 5 wherein the portion of the WEC producing a voltage at the output of the electric generator exhibits one of an inductive and capacitive reactance, and wherein said means coupling the load to the output of the electric generator includes a reactive element exhibiting the other one of an inductive and capacitive reactance for enhancing the generation of a resonant condition in the power generation of the WEC.

7. A WEC as claimed in claim 6 wherein the equivalent impedance of the shell and piston and the mechanical motion to electrical energy converter is primarily capacitive and wherein the reactive element coupling the load to the output of the converter includes an inductive element (L) whose reactance ($\omega L$) is approximately equal to the reactance $[1/(\omega)(C_E)]$ exhibited at the output of the electric generator for enhancing the generation of a resonant condition.

8. A WEC as claimed in claim 3 wherein the shell has a tubular shape and the piston moves up and down within the tubular enclosure.

9. A WEC as claimed in claim 7 further including a controller for varying the impedance of the load for maintaining the value of the load seen by the generator equal to an optimum value (RLOPT) for optimum power transfer.

10. A WEC as claimed in claim 7 further including a controller for varying the inductive element for maintaining the system in resonance as a function of changes in at least one of the amplitude, frequency and phase of the waves.

11. A WEC as claimed in claim 7 wherein said inductive element includes at least two different inductive components switchably interconnected to selectively increase or decrease the inductance in the power loop.

12. A WEC as claimed in claim 7 further including a sensor for sensing at least one of the conditions of the waves and the status of the WEC system and a controller responsive to signals from the sensor for varying the values of at least one of the load and the inductive element for maintaining an optimum value of load and enhancing resonance of the system.

13. A WEC as claimed in claim 1 including a sensor for sensing selected conditions of the waves, a controller coupled to said mechanical motion to electric energy converter and being also coupled to said load for controlling the effective impedance of the load as a function of variations in the waves.

14. A WEC as claimed in claim 1 wherein the electrical generating portion of the WEC exhibits inductive characteristics and wherein the means coupling the load to the output of the electric generator includes a capacitive element for enhancing a resonant condition in a series loop including the electric generation portion of the WEC, the load and the capacitive element.

15. A WEC as claimed in claim 14 further including a controller for varying the capacitive element for maintaining the system in resonance as a function of changes in at least one of the amplitude, frequency and phase of the waves.

16. A WEC as claimed in claim 14 wherein said capacitive element includes at least two different capacitive components switchably interconnected to selectively increase or decrease the capacitance in the power loop.

17. A WEC as claimed in claim 14 further including a sensor for sensing the peak conditions of the waves and a controller responsive to signals from the sensor for varying the values of at least one of the load and the capacitive element for maintaining an optimum value of load and enhancing resonance of the system.

18. A WEC as claimed in claim 6, further including a controller for varying at least one of the effective resistance of the load and the impedance of the element coupling the load to the electric generator for optimizing power transfer and maintaining resonance, and further including sensor means for sensing selected points in the power generation loop and producing signals applied to the controller for varying the load and the impedance of the coupling element.

19. A wave energy converter (WEC) comprising:

a structure which when placed in a body of water includes mechanical parts which move and drive an electric generator in response to waves in the body of water for producing at an output of the electric generator a voltage which is a function of the motion induced by the waves;

wherein the portion of the structure generating a voltage at the output of the electric generator exhibits one of an inductive and capacitive reactance;

a load coupled to said output of the electric generator having an impedance whose value is a function of the period of the waves and of the mass of the water and structure which move; and a reactive component coupled to the output of the electric generator in series with the load, said reactive component being selected to be the other one of said inductive and capacitive reactance exhibited at the output of the electrical generator for enhancing resonance in the WEC.

20. A power generating system comprising:

a structure which includes mechanical parts which move and drive an electric generator when the structure is subjected to naturally recurring forces for producing at an output of the electric generator a voltage which is a function of the motion induced by the naturally recurring forces;

wherein the portion of the structure generating a voltage at the output of the electric generator exhibits one of an inductive and capacitive reactance;

a load coupled to said output of the electric generator having an impedance whose value is a function of the period of the naturally recurring force and of the mass being moved; and a reactive component coupled to the output of the electric generator in series with the load, said reactive component being selected to be the other one of said inductive and capacitive reactance exhibited at the output of the electrical generator for enhancing resonance in the power generating system.

21. A method for optimizing the power transfer in a system including a wave energy converter (WEC) comprising a shell mounted about a piston forming a combination which when placed in a body of water is responsive to waves in the body of water for producing relative motion between the shell and the piston and further including a converter including an electric generator for converting the mechanical motion to produce electric energy at an output of the converter for predetermined conditions of the waves comprising the steps of:

(a) determining $1/\omega\, C_E$; where:

$\omega$ is equal to the angular frequency of the waves expressible as $2\pi/T$ where T is the period of the waves; and $C_E$ is approximately equal to MT/K, where MT is equal to the mass of the shell and the mass of the water moved by the shell and K is an electromechanical coupling constant; and (b) selecting a load having a value approximately equal to $(1/\omega C_E)$ and coupling the load to the output of the converter.

22. A method as claimed in claim 21, further including the step of determining the value of an inductive element coupling the load to the output of the converter for inductively tuning the load at, or near, the dominant wave frequency, the reactance ($\omega L$) of the inductive element having a value approximately equal to $1/\omega\, C_E$.

23. In combination with a wave energy converter (WEC) system designed to be placed in a body of water having waves exhibiting variation in amplitude, frequency and phase and in which the energy of the waves is converted to electrical energy and wherein the electrical energy is applied to a load, the improvement comprising:

setting the initial value of said load to have an impedance whose value is a predetermined function of the average period of the waves and of the mass of the water in the WEC; and means for varying the impedance of the load as a function of changes in at least one of the frequency, amplitude and phase of the waves providing the input power to the WEC system for maintaining the impedance of the load at a predetermined optimum value.

24. In the combination as claimed in claim 23, wherein the electrical energy is applied to the load via an inductive element having a value to tend to cause resonance in a loop which includes components coupling the electric energy to the load.

25. In combination with a wave energy converter (WEC) system designed to be placed in a body of water having waves and in which the energy of the waves causes movement of a certain mass ($M_T$) associated with the WEC as a function of the period of the waves and wherein the movement of the WEC is converted by means including an electric generator to electrical energy and wherein the electrical energy is applied to a load, the improvement comprising:

reactive means coupled between an output of the electric generator and the load, said reactive means being selected to have a value for causing the output of the electric generator including the load to resonate with the mass ($M_T$) of the WEC being moved.

26. In the combination as claimed in claim 25 wherein the load has a value approximately equal to $1/\omega\, C_E$; where:

$\omega$ is equal to the angular frequency of the waves expressible as $2\pi/T$ where T is the period of the waves; and $C_E$ is approximately equal to the total mass moved ($M_T$) which includes Mwc/K and the mass of the WEC, where Mwc is approximately equal to the mass of the water within the WEC and K is an electromechanical coupling constant.

27. In the combination as claimed in claim 26 wherein the reactive means is an inductive component whose impedance ($\omega L$) has a value approximately equal to $1/\omega\, C_E$.

* * * * *